US012749952B2

(12) United States Patent
Müller et al.

(10) Patent No.: US 12,749,952 B2
(45) Date of Patent: Sep. 29, 2026

(54) ELECTRIC MOTOR HAVING AN ANGLE SENSOR

(71) Applicant: SEW-EURODRIVE GMBH & CO. KG, Bruchsal (DE)

(72) Inventors: Michael Müller, Karlsdorf-Neuthard (DE); Manuel Heil, Eggenstein-Leopoldshafen (DE); Frank Hartmann, St. Leon Rot (DE); Sandro Wittemann, Philippsburg (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 191 days.

(21) Appl. No.: 18/834,066

(22) PCT Filed: Dec. 19, 2022

(86) PCT No.: PCT/EP2022/086782

§ 371 (c)(1),
(2) Date: Jul. 29, 2024

(87) PCT Pub. No.: WO2023/143820

PCT Pub. Date: Aug. 3, 2023

(65) Prior Publication Data

US 2025/0158490 A1 May 15, 2025

(30) Foreign Application Priority Data

Jan. 27, 2022 (DE) ......................... 102022000319.8

(51) Int. Cl.

*H02K 11/21* (2016.01)
*G01B 7/30* (2006.01)

(Continued)

(52) U.S. Cl.

CPC ............. *H02K 11/215* (2016.01); *G01B 7/30* (2013.01); *G01D 5/20* (2013.01); *H02K 5/173* (2013.01);

(Continued)

(58) Field of Classification Search

CPC ........ H02K 1/2753; H02K 21/14; H02K 7/14; H02K 7/08; H02K 11/215; H02K 7/1025;

(Continued)

(56) References Cited

U.S. PATENT DOCUMENTS 7,447,035 B2 11/2008 Liu

FOREIGN PATENT DOCUMENTS

DE 102008019797 A1 10/2009
DE 102020006900 A1 6/2021

(Continued)

OTHER PUBLICATIONS

EP-1511157-A2 machine translation Mar. 28, 2026.*

(Continued)

*Primary Examiner* — Leda T Pham

(74) *Attorney, Agent, or Firm* — Carter, DeLuca & Farrell LLP

(57) ABSTRACT

An electric motor includes an angle sensor, and the angle sensor includes a main body, a hood part, a holding part, a first circuit board, an intermediate flange, a second circuit board, a disk part, e.g., with a dimensional scale, and a hollow shaft. The rotor shaft of the angle sensor is connected to a rotor of the electric motor for conjoint rotation. The disc part is slid onto the hollow shaft and bears against a shaft step and/or a flat surface region of the hollow shaft. The second circuit board has conducting tracks acting and/or formed as coil winding and is held clamped between the main body and the intermediate flange. The intermediate flange is pressed towards the main body by the screw head (Continued)

of another screw screwed into a threaded bore of the main body. The first circuit board is held clamped between the intermediate flange and the holding part. The screw head of a screw screwed into a threaded bore of the intermediate flange presses the holding part towards the intermediate flange, and an elastically preloaded sheet-metal part supported on the hood part is disposed between the holding part and the hood part.

19 Claims, 1 Drawing Sheet

(51) Int. Cl.

| | |
|---|---|
| ***G01D 5/20*** | (2006.01) |
| ***H02K 5/173*** | (2006.01) |
| ***H02K 7/08*** | (2006.01) |
| ***H02K 7/102*** | (2006.01) |
| ***H02K 9/22*** | (2006.01) |
| ***H02K 11/02*** | (2016.01) |
| ***H02K 11/215*** | (2016.01) |

(52) U.S. Cl.
CPC ............ *H02K 7/08* (2013.01); *H02K 7/1023* (2013.01); *H02K 9/223* (2021.01); *H02K 11/02* (2013.01); *H02K 2211/03* (2013.01)

(58) Field of Classification Search
CPC ...... H02K 11/225; H02K 11/33; H02K 11/30; H02K 11/02; H02K 5/173; H02K 7/1023; H02K 9/223; F04D 25/066; G01D 5/20; G01B 7/30
See application file for complete search history.

(56) References Cited

FOREIGN PATENT DOCUMENTS

| | | | | | |
|---|---|---|---|---|---|
| EP | 0650058 | A1 | 4/1995 | | |
| EP | 1511157 | A2 * | 3/2005 | ........... | H02K 11/225 |
| EP | 2693169 | A1 | 2/2014 | | |
| EP | 2703783 | A2 | 3/2014 | | |
| JP | 2020124056 | A | 8/2020 | | |
| WO | 2008122387 | A2 | 10/2008 | | |

OTHER PUBLICATIONS

International Search Report issued in corresponding International Application No. PCT/EP2022/086782 dated Apr. 12, 2023, pp. 1-2, English Translation.

International Report on Patentability issued in corresponding International Application No. PCT/EP2022/086782, dated Jul. 30, 2024, pp. 1-10, English Translation.

* cited by examiner

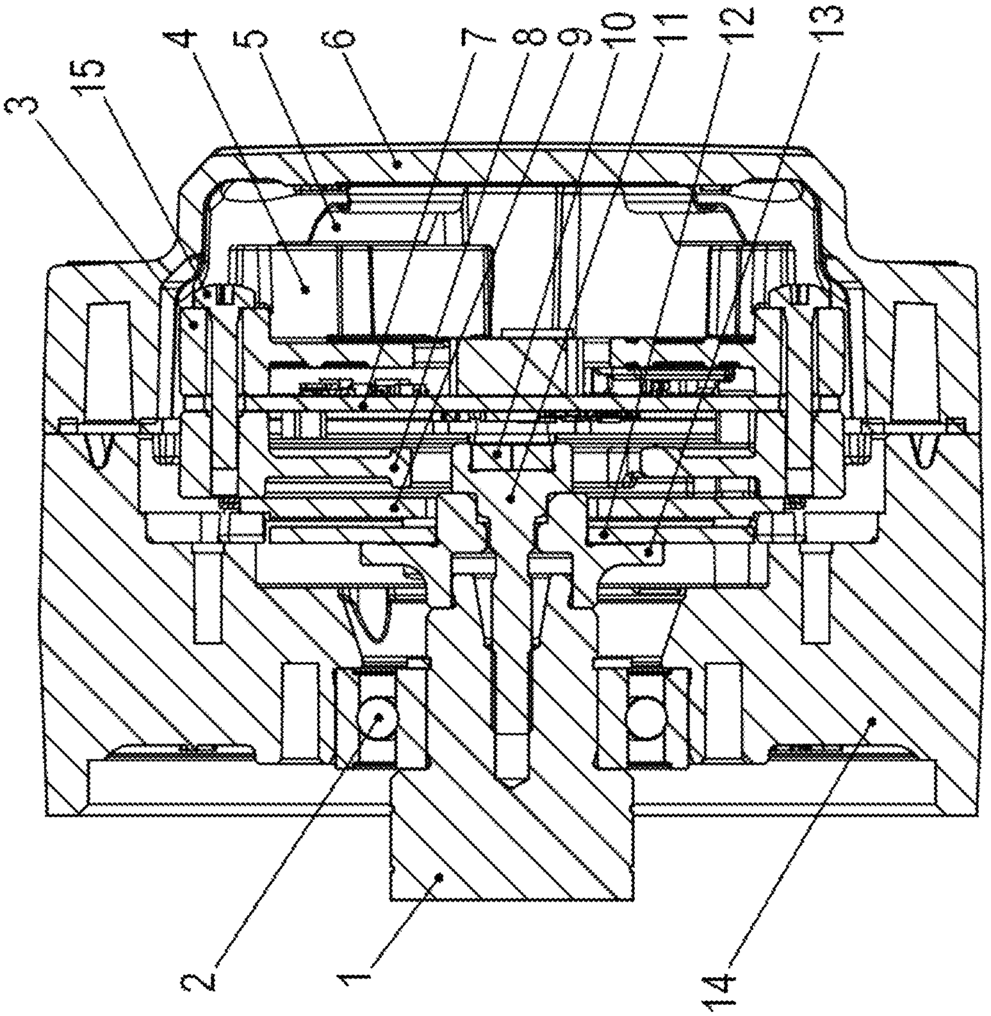
1
2
3
4
5
6
7
8
9
10
11
12
13
14
15

ELECTRIC MOTOR HAVING AN ANGLE SENSOR

FIELD OF THE INVENTION

The present invention relates to an electric motor having an angle sensor.

BACKGROUND INFORMATION

In certain conventional systems, an electric motor has a rotor that passes through different angular positions during operation.

A brake arrangement with shaft and electric motor is described in German Patent Document No. 10 2020 006 900.

A flange motor with measuring device for detecting the rotation of the motor shaft is described in European Patent Document No. 0 650 058.

A cooling arrangement is described in German Patent Document No. 10 2008 019 797.

A heat dissipation arrangement is described in U.S. Pat. No. 7,447,035.

A fixing device for a circuit board is described in PCT Patent Document No. WO 2008/122387.

SUMMARY

Example embodiments of the present invention provide an electric motor with an angle sensor, having a compact configuration.

According to example embodiments, in an electric motor with an angle sensor, the angle sensor includes: a main body, a hood part, a holding part, a first circuit board, an intermediate flange, a second circuit board, a disk part, e.g., with a dimensional scale, and a hollow shaft. The rotor shaft of the angle sensor is connected to a rotor of the electric motor for conjoint rotation. The disc part is slid onto the hollow shaft, e.g., is slid on without play for centering in the radial direction, and bears against a shaft step and/or a flat surface region of the hollow shaft, e.g., which region is disposed at a single axial position. The second circuit board has conducting tracks acting and/or formed as coil winding and is held clamped between the main body and the intermediate flange, for example. The intermediate flange is pressed towards the main body by the screw head of another screw screwed into a threaded bore of the main body, and the first circuit board is held clamped between the intermediate flange and the holding part, for example. The screw head of a screw screwed into a threaded bore of the intermediate flange presses the holding part towards the intermediate flange, and an elastically preloaded sheet-metal part supported on the hood part is disposed between the holding part and the hood part.

Thus, the angle sensor has a stacked configuration. Thus, improved cooling can be achieved, since the intermediate flange and holding part between the circuit boards conduct the heat out. The stack is stacked in the axial direction, e.g., so that the stacking direction is parallel to the axial direction. The stack includes, on the one hand, the circuit boards and, on the other hand, the holding part and the intermediate flange, e.g., as well as an optional additional electronic circuit. The up to three electrically energizable stacking parts are separated from each other via the, e.g., metallic stacking parts, i.e., holding part and intermediate flange. This allows for improved cooling and electromagnetic shielding as well as a compact configuration.

The holding part and the intermediate flange are, for example, formed such that the circuit boards are respectively disposed in a spatial region which is delimited and surrounded by the intermediate flange together with the holding part or by the intermediate flange together with the main body or by the holding part together with the hood part. For this purpose, each of the two parts is axially thickened in a first radially outer region.

According to example embodiments, the electric motor has an electromagnetically actuated brake, which has a coil which is suppliable from an electronic circuit which feeds the coil depending on a control signal. The control signal is fed from the first circuit board to the electronic circuit. The electronic circuit is disposed on the side of the holding part facing away from the first circuit board, e.g., between the hood part and the holding part. The sheet-metal part is supported on the electronic circuit, i.e., for example, is disposed elastically preloaded between the electronic circuit and the hood part. For example, the sheet-metal part is arranged as a bent part. Thus, the signal electronics of the first circuit board are not only provided for detecting the angular position, but also for generating the control pulses for the brake, and the supply voltage for the brake is generated and controlled in the angle sensor and fed to the brake disposed in the electric motor at a distance from the angle sensor.

According to example embodiments, the rotor is rotatably mounted via two bearings accommodated in the housing of the electric motor. For example, the housing has a stator housing and two bearing flanges spaced apart from one another, each connected to the stator housing, in each of which one of the two bearings is accommodated. Thus, the rotor itself is rotatably mounted independently of the hollow shaft of the angle sensor.

According to example embodiments, the screw head of a first screw screwed into a threaded hole in the rotor shaft presses the hollow shaft against the rotor shaft, and a permanent magnet is accommodated in the screw head, e.g., the center of gravity of which is disposed in the axis of rotation of the hollow shaft. Thus, the total number of rotations completed by the rotor part can be captured.

According to example embodiments, the first circuit board is equipped with a magnetic field-sensitive sensor, e.g., a pulse wire sensor and/or a Wiegand sensor, which is in operative connection with the permanent magnet. For example, a counter mounted on the first circuit board for determining the number of rotations of the rotor shaft is electrically suppliable by the sensor. Thus, even if the power supply fails, the counter is suppliable with energy from the pulses themselves.

Capturing the full rotations completed is thus possible and can be carried out at any time.

According to example embodiments, the conducting tracks of the second circuit board, which are formed as coil windings, are in operative connection with the dimensional scale of the disk part and the signal electronics of the first circuit board are electrically connected to the coil windings and are adapted to be suitable to determine the angular position of the disk part in relation to the second circuit board.

According to example embodiments, the disk part covers a first radial distance region, e.g., in relation to the axis of rotation of the rotor shaft, and the hollow part has an axially greater thickness radially outside the first radial distance region than in the first radial distance region. Thus, the disc part has a dimensional scale and is precisely centered and aligned. This is because centering takes place on the shaft journal, e.g., the dome section, of the hollow shaft.

According to example embodiments, the intermediate flange has an axially greater thickness radially outside the first radial distance region than in the first radial distance region. Thus, the electronic components of the first circuit board can be disposed in the first radial distance region, where they are shielded and surrounded in a housing-forming manner.

According to example embodiments, the electronic circuit is cast using casting compound and/or is disposed in a housing.

Thus, the sheet-metal part can be readily supported and at an insulating distance.

According to example embodiments, the first circuit board is disposed clamped between the hollow part and the intermediate flange, e.g., outside the first radial distance region. Thus, the first circuit board is held mechanically stable and the electronic components disposed on the first circuit board are protected from electromagnetic interference radiation.

According to example embodiments, the second circuit board is disposed clamped between the intermediate flange and the main body, e.g., outside the first radial distance region. Thus, the second circuit board is held mechanically stable and the electronic components disposed on the second circuit board are protected from electromagnetic interference radiation.

According to example embodiments, the screw axis of the first screw is aligned coaxially to the axis of rotation of the rotor shaft. Thus, the permanent magnet located in the center of the screw head triggers exactly one pulse per rotation on the pulse wire sensor disposed on the second circuit board, so that a counter can determine the total number of rotations from the number of pulses and the direction of rotation.

According to example embodiments, the region covered in the axial direction by the screw head of the first screw and/or the region covered in the axial direction by the permanent magnet includes the region covered in the axial direction by the intermediate flange. Thus, the first screw protrudes through a recess in the intermediate flange, and the angle sensor, via the disk part with dimensional scale and with the second circuit board, can thus not only determine the angular position in fine resolution, but also the number of total rotations, by triggering a voltage pulse on the pulse wire sensor mounted on the first circuit board for each rotation of the first screw together with the permanent magnet.

According to example embodiments, the hood part and/or the main body is and/or are made of metal. Thus, improved heat removal and electromagnetic shielding can be achieved, as well as mechanical stability.

According to example embodiments, the intermediate flange and/or the holding part is or are made of metal. Thus, improved heat removal and electromagnetic shielding can be achieved.

Further features and aspects of example embodiments of the present invention are explained in more detail below with reference to the appended schematic FIGURE.

BRIEF DESCRIPTION OF THE DRAWING

FIG. 1 is a cross-sectional view of an angle sensor provided for an electric motor.

DETAILED DESCRIPTION

As illustrated in FIG. 1, the angle sensor has a part that is rotatably mounted relative to a stationary part and can be connected to the rotor of the electric motor for conjoint rotation. For example, a rotor shaft 1 of the angle sensor can be connected to the rotor of the electric motor or can be formed in one piece.

The electric motor has a stator housing relative to which the rotor is rotatably mounted.

A, e.g., pot-shaped, main body 14 can be connected to the stator housing for conjoint rotation.

A hood part 6 is connected to the main body 14, which together with the main body 14 forms a housing of the angle sensor.

The hood part 6 is, e.g., made of metal, e.g., so that a high thermal conductivity is available.

The rotor shaft 1 has a bore, e.g., a threaded bore, on its end face facing the hood part 6, into which bore a screw 11 is screwed, the screw head of which presses a hollow shaft 13 against the rotor shaft 1, e.g., against the end face of the rotor shaft 1. In this manner, the hollow shaft 13 is connected to the rotor shaft 1 for conjoint rotation.

The bore axis of the bore is aligned coaxially, e.g., concentrically, to the axis of rotation of the rotor shaft 1.

A permanent magnet 10 is disposed in a recess, e.g., a depression, in the screw head, e.g., on the end face of the screw head facing away from the rotor shaft 1. The permanent magnet 10 serves as an encoder for detecting the integer rotations of the rotor shaft 1.

The hollow shaft 13 has a surface section which is flat and is disposed at a single axial position. The axial direction is aligned parallel to the axis of rotation of the rotor shaft 1.

For example, the hollow shaft 13 is arranged as a rotationally symmetrical part.

An annular disk part 12, e.g., a target disk, is attached to the surface section.

For this purpose, the disk part 12 has a centrally disposed, axially passing through hole through which a cylindrical section of the hollow shaft 13 protrudes. In this manner, the disk part 12 can be slid onto the cylindrical section of the hollow shaft 13 and can thus be precisely centered by the section in the radial direction. By placing it against the surface section and then connecting it, e.g., by connecting it to the hollow shaft 13 in material-locking manner, the disk part is aligned parallel to the flat surface section.

The disk part 12 is arranged as a target disk. For example, the disk part 12 has a dimensional scale which in an interactive manner enters into an operative connection with the conducting tracks of a circuit board 9 formed as coil windings.

The disk part 12 has ferromagnetic structures or coil windings as a dimensional scale, which are formed such that the inductive coupling to the coil windings of the circuit board 9 depends on the angular position of the disk part 12, thus allowing for determining the angular position of the disk part 12 relative to the circuit board 9 by determining the inductance of the coil windings.

The circuit board 9 rests on a projection of the main body 14 and is pressed against this projection by the intermediate flange 8. The intermediate flange 8 rests on the side of the circuit board 9 facing away from the projection.

The intermediate flange 8 is pressed against the main body 14 via screws whose screw head respectively presses on the intermediate flange 8 and is thus connected thereto.

On the side of the intermediate flange 8 facing away from the circuit board 9, a circuit board 7 of a signal electronics unit is placed.

A holding part 3 rests against the side of the circuit board 7 of the signal electronics facing away from the intermediate flange 8 and is pressed against the circuit board 7 by the screw head of a screw 15 passing through the holding part 3 and through the circuit board 7, which is thus pressed against the intermediate flange 8. The screw 15 is screwed into a threaded bore of the intermediate flange 8.

An electronic circuit 4, e.g., a rectifier, is disposed on the side of the holding part 3 facing away from the circuit board 7, which circuit is, e.g., cast with casting compound or has a module housing which encloses power semiconductors such as diodes, etc.

To remove the heat from the module housing, an elastically preloaded sheet-metal part 5 is disposed between the module housing and the hood part 6. Since this sheet-metal part 5 touches both the module housing and the hood part 6, a heat flow from the module housing to the hood part 6 is removed in improved manner.

The signal electronics are electrically connected to the conducting tracks of the circuit board 9 and detect the inductive coupling and/or inductance of the conducting tracks of the circuit board 9, which are arranged as coil windings, in order to determine the angular position.

The electronic circuit 4 is provided for supplying a coil of an electromagnetically actuated brake. For this purpose, the circuit has a rectifier which is cooled via the sheet-metal part 5 and the hood part 6. In addition, the electronic circuit 4 has a controllable semiconductor switch which controls the energy supplied to the coil by the rectifier, i.e., causes the coil to be energized or de-energized. The control signal of the controllable semiconductor switch is generated by the signal electronics on the circuit board 7, e.g., depending on a data interface, which is disposed on the circuit board 7 and is suitable for data transmission between the signal electronics and an inverter feeding the electric motor. The sensor signals of the angle sensor, e.g., the detected angular position of the rotor, are transmitted from the circuit board 7 to the inverter, and the control signals for the controllable semiconductor switch and thus for the electromagnetically actuated brake are transmitted from the inverter via the signal electronics to the electronic circuit 4.

A magnetic field sensor, e.g., a Wiegand sensor and/or Hall sensor, is also fitted on the circuit board 7 so that the angular position of the permanent magnet can also be detected or at least an electrical voltage pulse can be generated for each rotation. In this manner, a voltage pulse can be generated per rotation of the rotor with a pulse wire sensor, e.g., a Wiegand sensor, fitted on the circuit board 7, so that the total number of rotations of the rotor can be readily determined by counting the pulses, e.g., via a counter of the signal electronics.

Since the intermediate flange 8 is disposed axially between the circuit board 7 of the signal electronics and the circuit board 9 with energized conducting tracks and is made of metallic material, heat can be removed from the two circuit boards to the main body 14 via the intermediate flange 8.

Heat can also be removed from the holding part 3, which is disposed axially between the electronic circuit and the signal electronics, via the screw 15 to the intermediate flange 8 and from there to the main body 14.

In addition, the metallic parts, such as the intermediate flange 8 and the holding part 3, shield electromagnetic radiation so that no mutual interference of the signal electronics, the electronic circuit, and the measured value acquisition is caused by the circuit board 9.

The stack structure, e.g., the stacked structure of the angle sensor, thus provides for efficient cooling with improved shielding against interfering radiation.

A bearing 3 is accommodated in the main body 14, by which the rotor shaft 1 is rotatably mounted. This means that the rotor in the electric motor is rotatably mounted via two bearings, and the rotor shaft 1, which is connected to the rotor for conjoint rotation, is rotatably mounted via bearing 2.

The holding part 3 has a greater axial wall thickness on its radially outer region than radially on the inside. The intermediate flange 8 also has a greater axial wall thickness in the radially outer region than further inwards. A recess in the holding part 3 faces a recess in the intermediate flange 8 such that the signal electronics 7 are disposed in the interior which is thus surrounded by the holding part 3 together with the intermediate flange 8.

This means that the signal electronics are enclosed, on the one hand, and, on the other hand, are cooled as efficiently as possible in all directions.

The circuit board 7 is clamped between the intermediate flange 8 and the holding part 3, e.g., in the radially outer region.

The circuit board 9, which, for example, has the coil windings acting as measuring coils, is clamped between the main body 14 and the intermediate flange 8, especially in the radially outer region. However, the circuit board 9 is centered on the hollow shaft 13 during the manufacture of the angle sensor, before it is clamped between the main body 14 and the intermediate flange 8.

For example, the disk part 12 is arranged as a circuit board and can thus be manufactured in cost-effective manner.

LIST OF REFERENCE NUMERALS

- 1 Rotor shaft
- 2 Bearing
- 3 Holding part, e.g., holder
- 4 Electronic circuit, e.g., rectifier
- 5 Sheet-metal part
- 6 Hood part
- 7 Circuit board of signal electronics
- 8 Intermediate flange
- 9 Circuit board with conducting tracks formed as coils
- 10 Permanent magnet
- 11 Screw
- 12 Disk part, e.g., target disk
- 13 Hollow shaft
- 14 Main body, e.g., pot-shaped main body
- 15 Screw

The invention claimed is:

1. An electric motor, comprising:

an angle sensor, including:
- a main body;
- a hood part;
- a holding part,
- a first circuit board;
- an intermediate flange;
- a second circuit board;
- a disk part;
- a hollow shaft; and
- a rotor shaft;

wherein the rotor shaft of the angle sensor is connected to a rotor of the electric motor for conjoint rotation;

wherein the disk part is arranged on the hollow shaft and bears against a shaft step and/or a flat surface region of the hollow shaft;

wherein the second circuit board includes conducting tracks acting and/or is arranged as a coil winding and is clamped between the main body and the intermediate flange;

wherein the intermediate flange is pressed towards the main body by a screw head of a screw screwed into a threaded bore of the main body;

wherein the first circuit board is clamped between the intermediate flange and the holding part;

wherein a screw head of a screw screwed into a threaded bore of the intermediate flange presses the holding part toward the intermediate flange; and wherein an elastically preloaded sheet-metal part supported on the hood part is arranged between the holding part and the hood part.

2. The electric motor according to claim 1, wherein the disk part includes a dimensional scale, the disk part is arranged on the hollow shaft without play to center the disk part in a radial direction, and the flat surface region is located at a single axial position.

3. The electric motor according to claim 1, wherein the electric motor includes an electromagnetically actuated brake, which has a coil that is suppliable from an electronic circuit that feeds the coil depending on a control signal fed from the first circuit board to the electronic circuit, the electronic circuit being arranged on a side of the holding part facing away from the first circuit board and/or between the hood part and the holding part, the sheet-metal part being supported on the electronic circuit.

4. The electric motor according to claim 3, wherein the sheet-metal part is arranged as a bent part.

5. The electric motor according to claim 1, wherein the rotor is rotatably mounted via two bearings accommodated in a housing of the electric motor.

6. The electric motor according to claim 5, wherein the housing includes a stator housing and two bearing flanges spaced apart from one another, each bearing flange connected to the stator housing, in each bearing flange, a respective one of the two bearings being accommodated.

7. The electric motor according to claim 1, wherein a screw head of a first screw screwed into a threaded hole in the rotor shaft presses the hollow shaft against the rotor shaft, and a permanent magnet is accommodated in the screw head of the first screw.

8. The electric motor according to claim 7, wherein a center of gravity of the permanent magnet is arranged on an axis of rotation of the hollow shaft.

9. The electric motor according to claim 7, wherein the first circuit board includes a magnetic field-sensitive sensor, a pulse wire sensor, and/or a Wiegand sensor in operative connection with the permanent magnet.

10. The electric motor according to claim 9, wherein a counter mounted on the first circuit board and adapted to determine a number of rotations of the rotor shaft is electrically suppliable by the sensor.

11. The electric motor according to claim 1, wherein conducting tracks of the second circuit board are arranged as coil windings and are in operative connection with a dimensional scale of the disk part, and signal electronics of the first circuit board are electrically connected to the coil windings and are adapted to determine an angular position of the disk part in relation to the second circuit board.

12. The electric motor according to claim 1, wherein the disk part covers a first radial distance region, the hollow shaft has an axially greater thickness radially outside the first radial distance region than in the first radial distance region, and/or the intermediate flange has an axially greater thickness radially outside the first radial distance region than in the first radial distance region.

13. The electric motor according to claim 3, wherein the electronic circuit is arranged in a casting compound and/or in a housing.

14. The electric motor according to claim 1, wherein the first circuit board is clamped between the hollow shaft and the intermediate flange.

15. The electric motor according to claim 1, wherein the second circuit board is clamped between the intermediate flange and the main body.

16. The electric motor according to claim 7, wherein a screw axis of the first screw is aligned coaxially to an axis of rotation of the rotor shaft.

17. The electric motor according to claim 7, wherein a region covered in an axial direction by the screw head of the first screw and/or a region covered in the axial direction by the permanent magnet is included in a region covered in the axial direction by the intermediate flange.

18. The electric motor according to claim 1, wherein the hood part and/or the main body is made of metal.

19. The electric motor according to claim 1, wherein the intermediate flange and/or the holding part is made of metal.

* * * * *